(12) United States Patent
Parthasarathy et al.

(10) Patent No.: US 9,477,622 B2
(45) Date of Patent: Oct. 25, 2016

(54) DETERMINISTIC METHOD TO SUPPORT MULTIPLE PRODUCERS WITH MULTIPLE CONSUMERS IN PEER OR HIERARCHICAL SYSTEMS

(75) Inventors: Balaji Parthasarathy, Phoenix, AZ (US); Marc A. Goldschmidt, Scottsdale, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 165 days.

(21) Appl. No.: 13/994,779

(22) PCT Filed: Feb. 7, 2012

(86) PCT No.: PCT/US2012/024163
§ 371 (c)(1),
(2), (4) Date: Mar. 11, 2014

(87) PCT Pub. No.: WO2013/119212
PCT Pub. Date: Aug. 15, 2013

(65) Prior Publication Data
US 2014/0181340 A1    Jun. 26, 2014

(51) Int. Cl.
*G06F 13/36* (2006.01)
*G06F 13/14* (2006.01)
*G06F 13/38* (2006.01)

(52) U.S. Cl.
CPC .............. *G06F 13/36* (2013.01); *G06F 13/14* (2013.01); *G06F 13/38* (2013.01); *G06F 13/382* (2013.01)

(58) Field of Classification Search
CPC ........ G06F 13/14; G06F 13/36; G06F 13/38; G06F 13/382
See application file for complete search history.

(56) References Cited

U.S. PATENT DOCUMENTS

| 5,961,621 | A | 10/1999 | Wu et al. | |
| 6,801,976 | B2* | 10/2004 | Creta | G06F 13/4013 710/310 |
| 7,996,572 | B2* | 8/2011 | Blankenship | G06F 13/387 710/5 |
| 8,775,700 | B2* | 7/2014 | Lakshmanamurthy | G06F 15/7864 710/57 |
| 2004/0064627 | A1* | 4/2004 | Shah | G06F 13/4031 710/310 |
| 2007/0186060 | A1* | 8/2007 | Nayyar | G06F 13/4022 711/154 |

FOREIGN PATENT DOCUMENTS

WO    2013/119212 A1    8/2013

OTHER PUBLICATIONS

International Preliminary Report on Patentability and Written Opinion received for PCT Patent Application No. PCT/US2012/24163, mailed on Aug. 21, 2014, 6 pages.
International Search Report and Written Opinion received for PCT Patent Application No. PCT/US2012/024163, mailed on Oct. 18, 2012 , 9 pages.

* cited by examiner

*Primary Examiner* — Eric Oberly
(74) *Attorney, Agent, or Firm* — Carrie A. Boone P.C.

(57) ABSTRACT

A transaction processing method is disclosed to solve the issue of multiple producers (software and hardware) and one or more consumers operating in a peer or hierarchical system. The transaction processing method is a deterministic method operable in a system having any number of producers. The producers themselves may be any combination of hardware and software and may be part of peer or hierarchical systems.

28 Claims, 12 Drawing Sheets

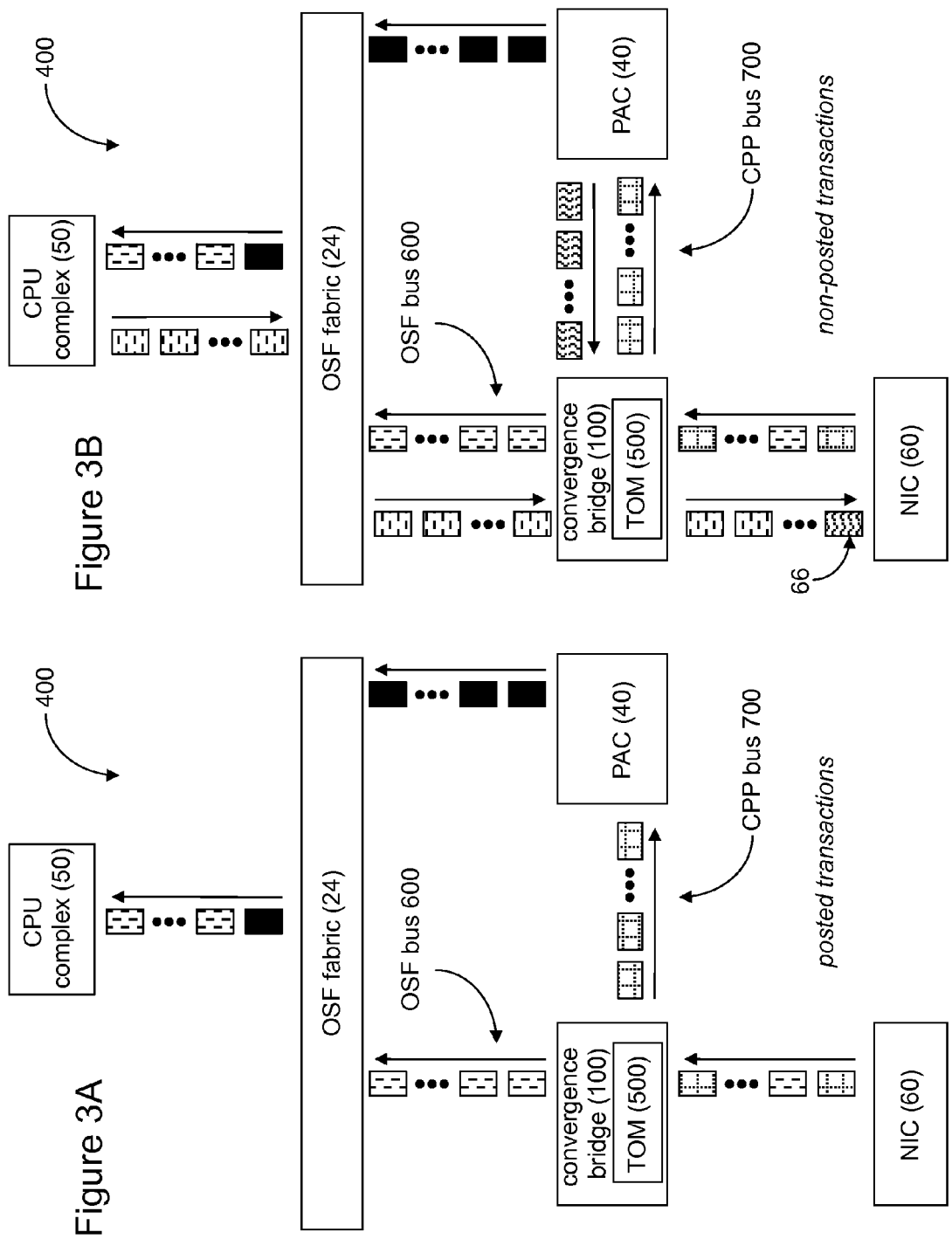

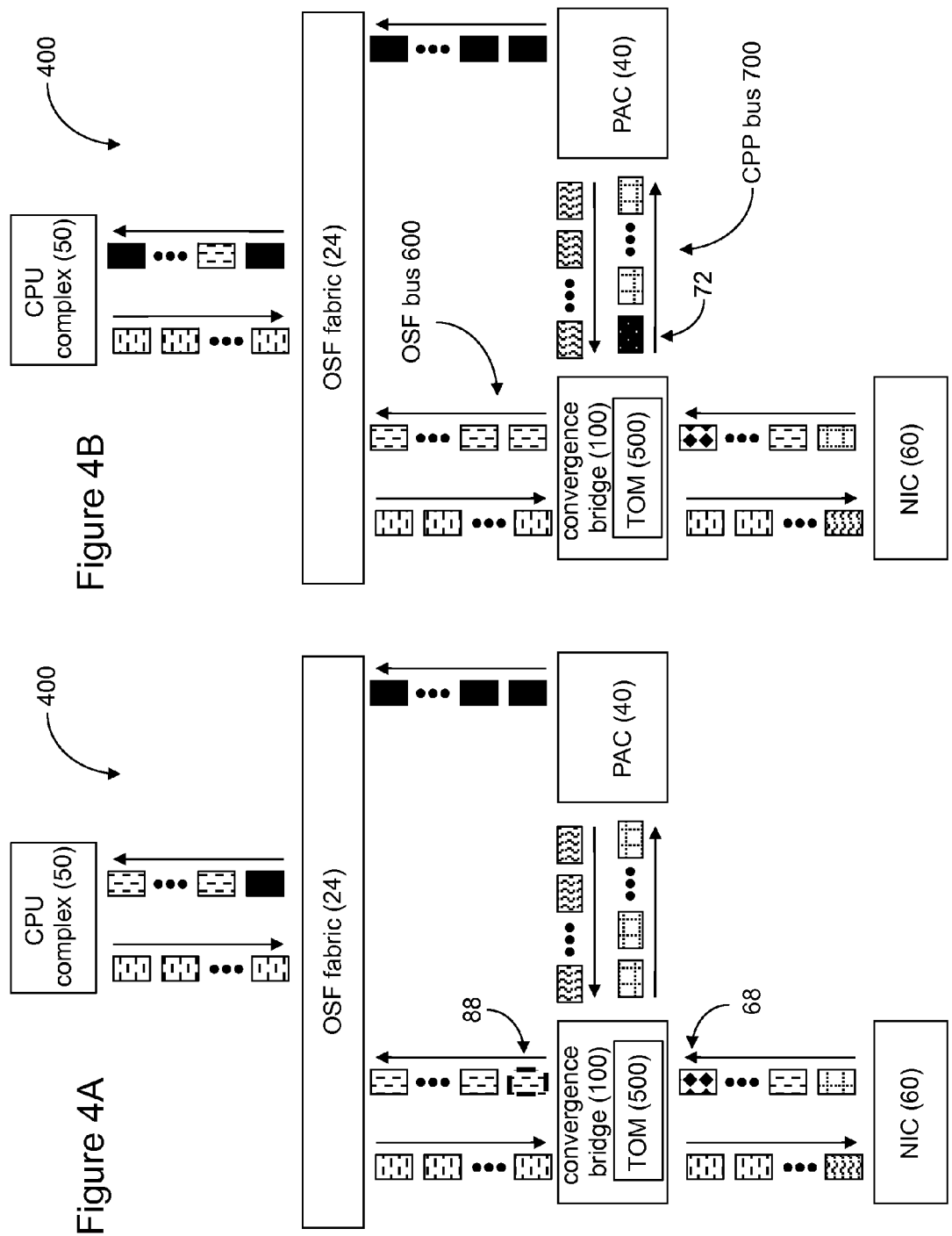

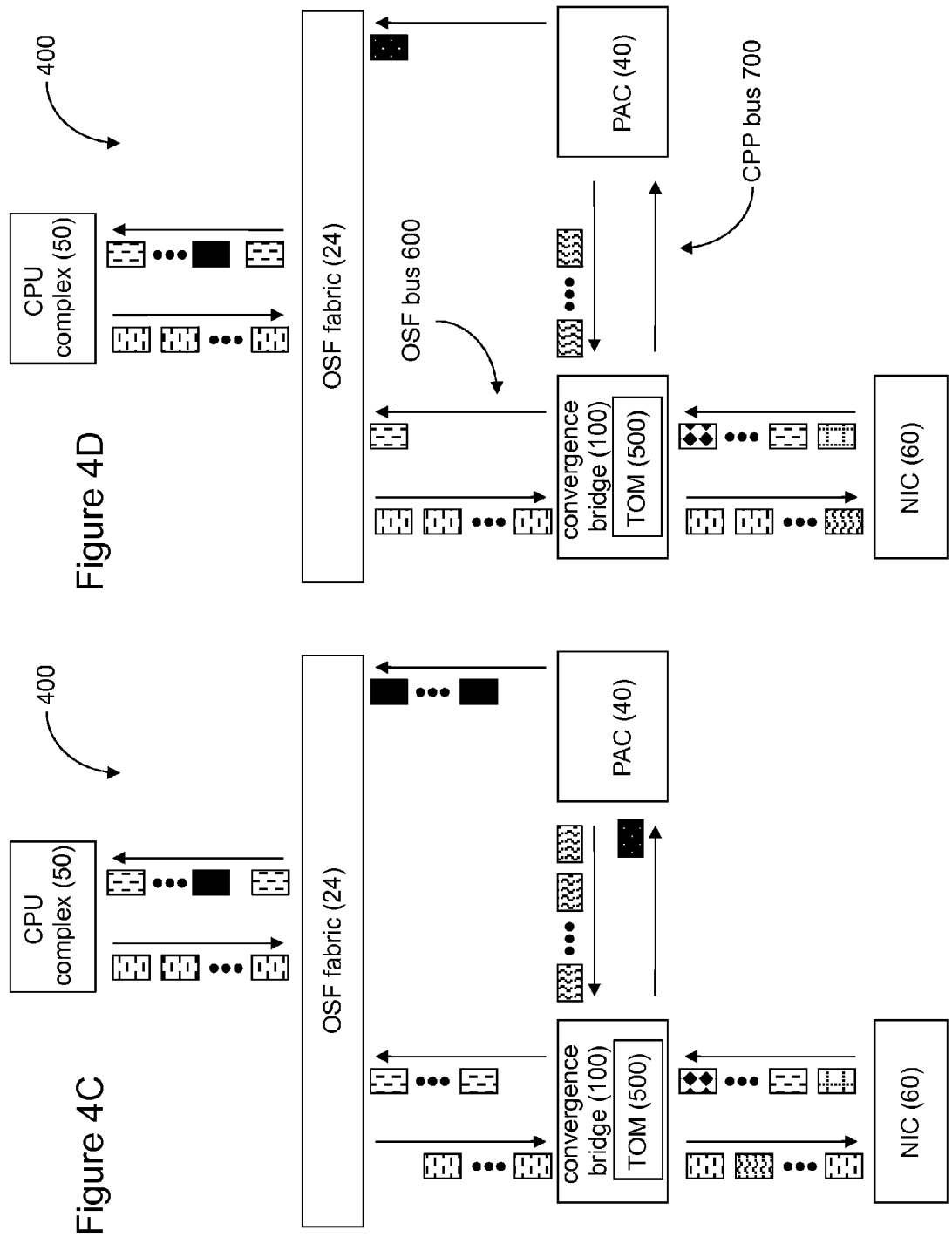

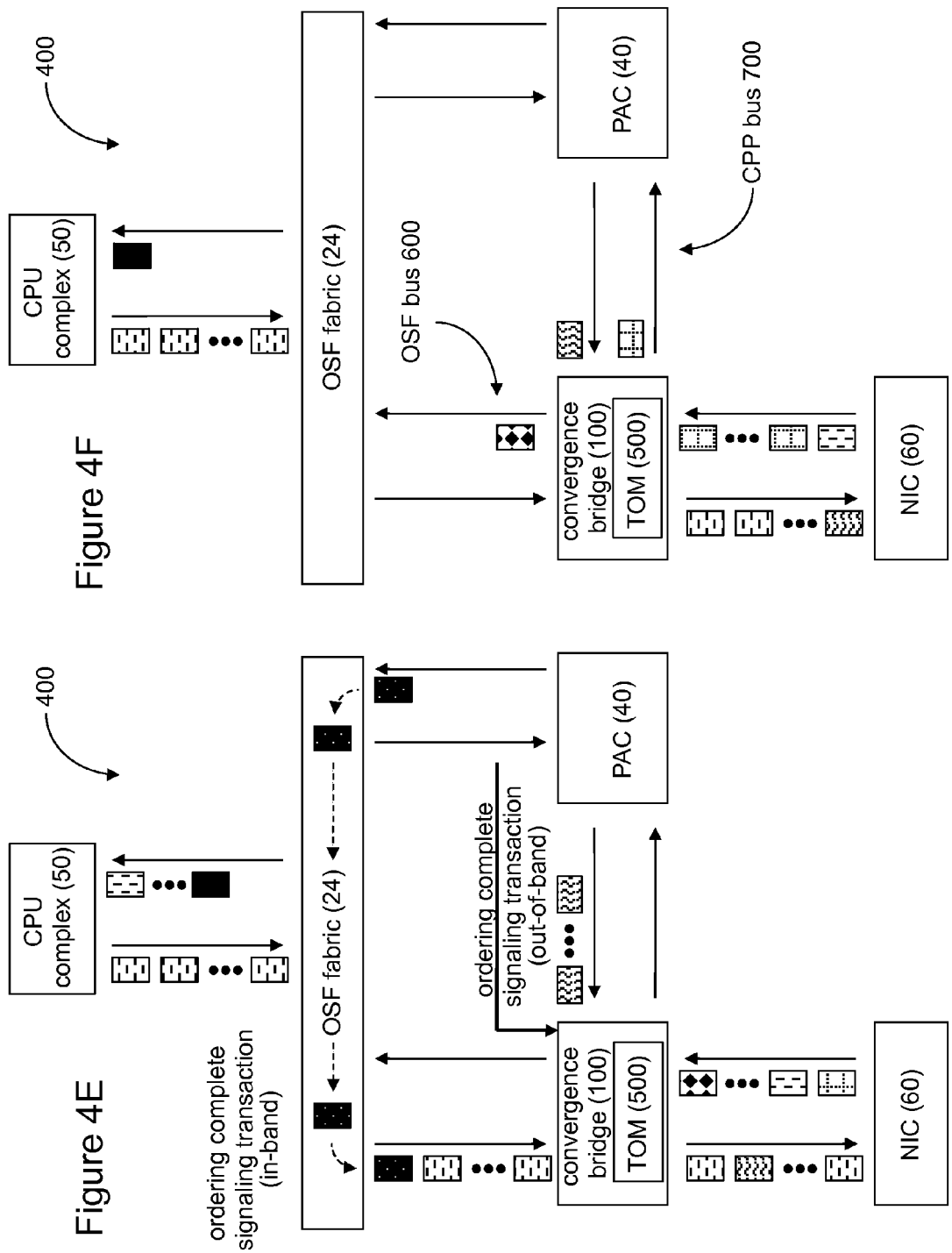

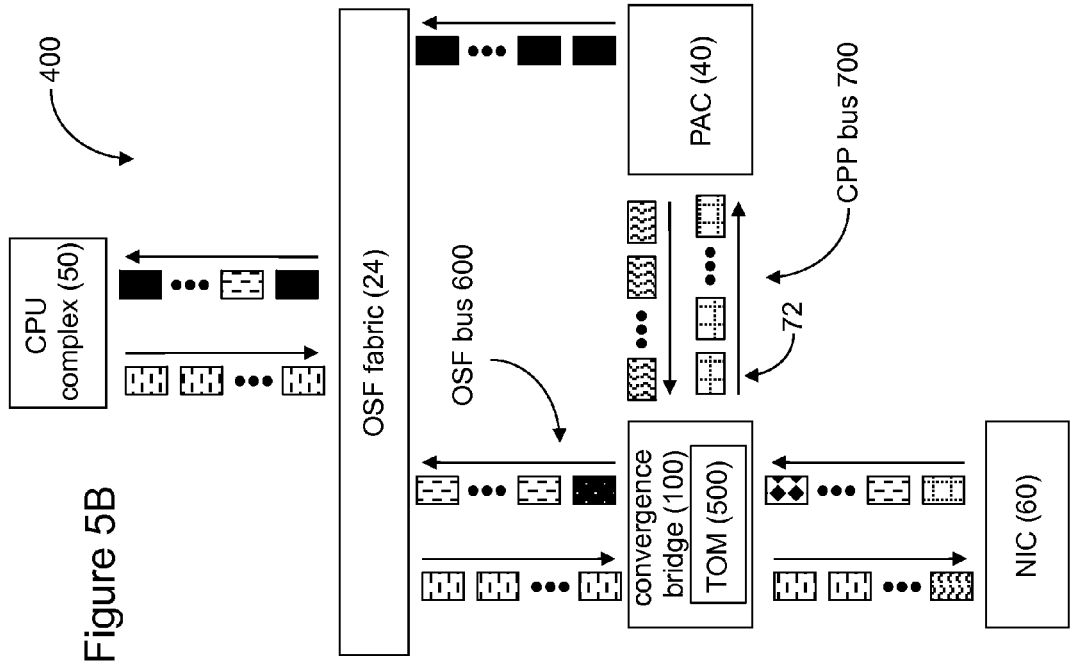
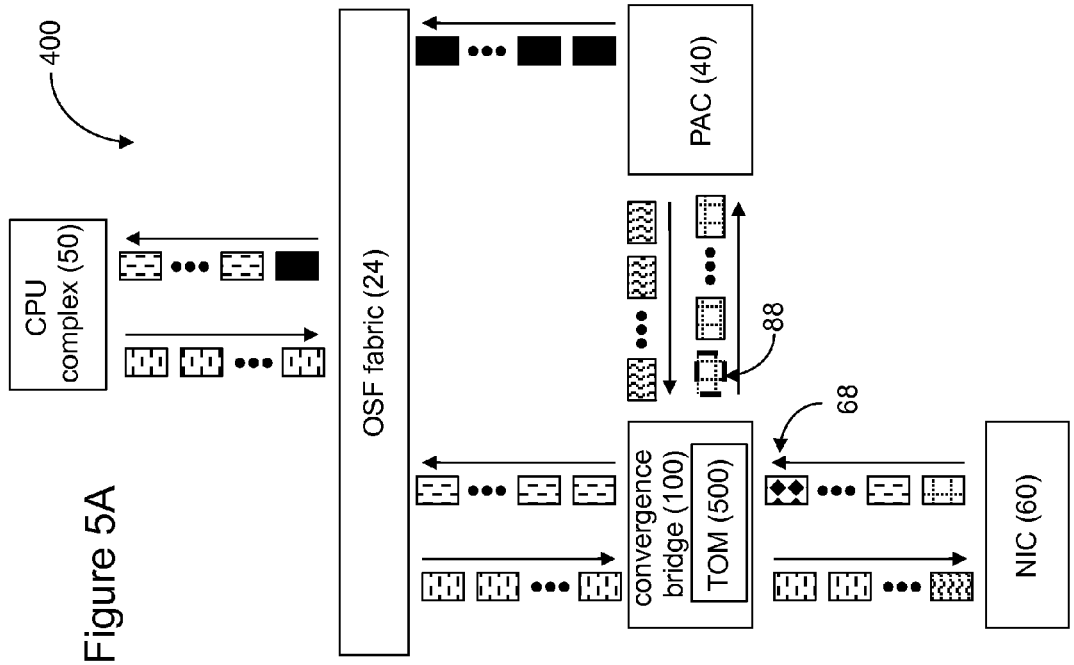

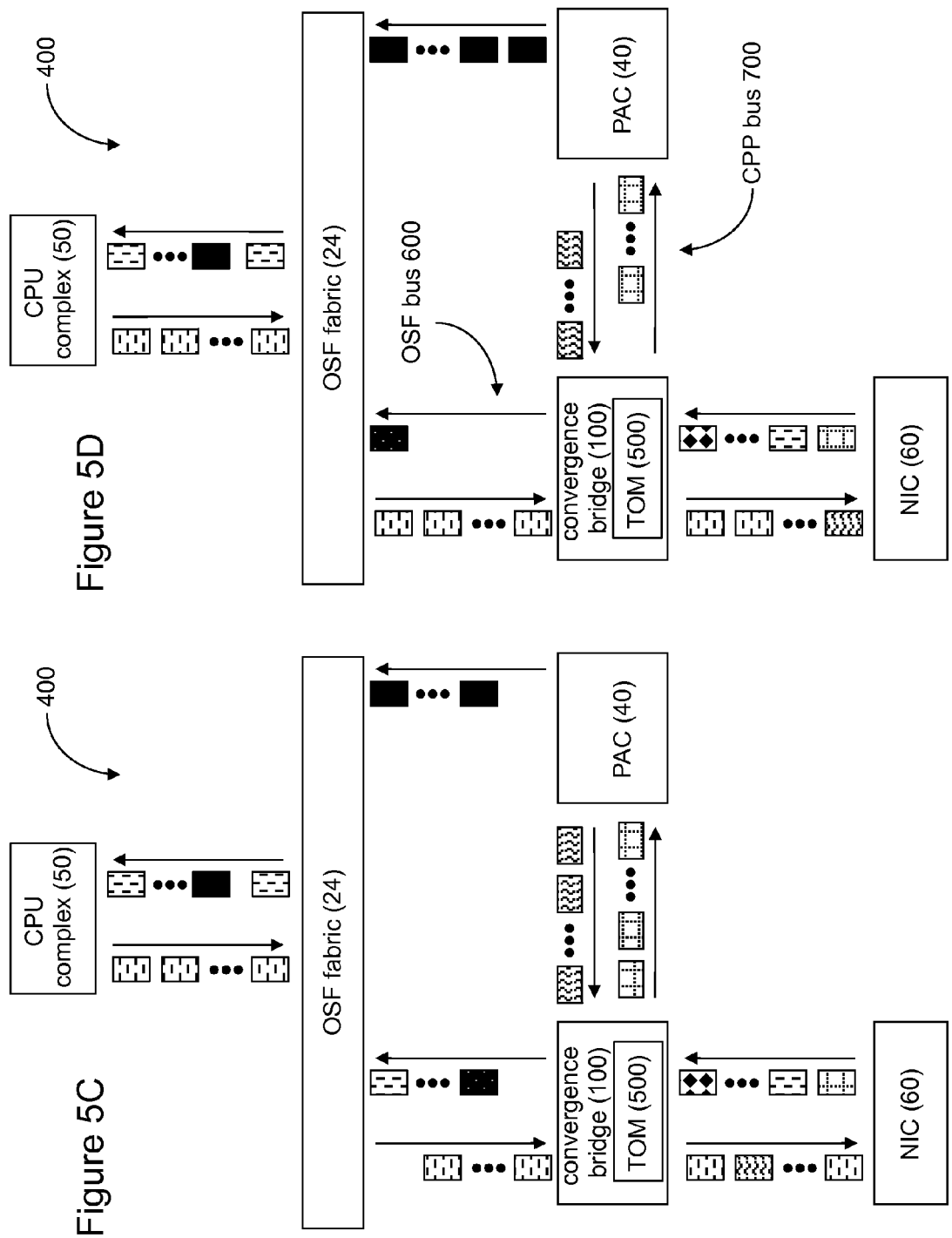

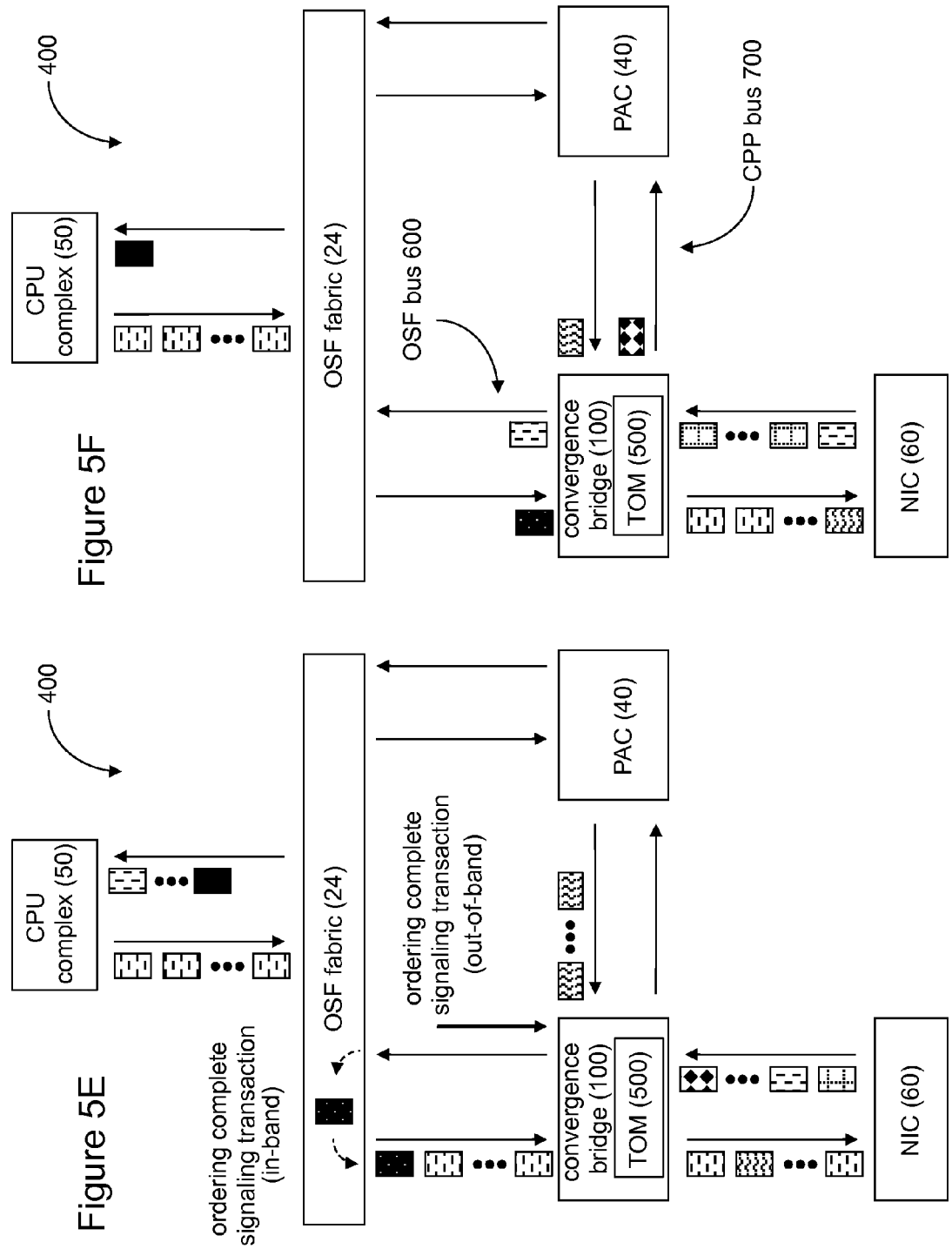

US 9,477,622 B2

DETERMINISTIC METHOD TO SUPPORT MULTIPLE PRODUCERS WITH MULTIPLE CONSUMERS IN PEER OR HIERARCHICAL SYSTEMS

CROSS-REFERENCE TO RELATED APPLICATIONS

This application is a continuation of Patent Cooperation Treaty Application No. PCT/US2012/024163, filed at the United States Patent and Trademark Office on Feb. 7, 2012.

TECHNICAL FIELD

This application relates to systems having multiple producers (hardware or software) and one or more consumers in peer or hierarchical systems.

BACKGROUND

A peripheral component interconnect (PCI) standard is a bus standard that is employed by many computer and peripherals manufacturers. More recently, PCI Express, denoted PCIe, enhances the original PCI bus standard with improved throughput, lower I/O pin count, and so on. (PCI Express is a trademark of the PCI Special Interest Group.)

Under PCIe, packets known as transaction layer packets (TLPs) are used to transfer data between devices. PCIe transactions include, but are not limited to, memory and I/O reads, memory and I/O writes, configuration reads and writes, messages, and interrupts. Memory reads, I/O reads and writes, and configuration reads and writes are considered non-posted transactions (in which the request is followed by a completion) while memory writes and messages are posted transactions (no reply necessary). Like memory writes, interrupts are posted transactions, in that there is no following transaction.

The entities involved in these transactions are known as producers and consumers. A typical system may, for example, include a CPU, an associated memory, and a network interface card (NIC). Either the NIC or the CPU may operate as a producer or as a consumer.

To make things a little easier, under PCIe, the producer/consumer model operates according to pre-defined ordering rules. In essence, these rules demand that transactions are performed in the order issued by software. Thus, two write operations followed by a read operation to the same memory location, when processed according to the ordering rules, ensures that the final read operation will return correct data from the memory location to the requester. The producer/consumer model also ensures that the software and hardware interaction is deterministic, so that special software becomes unnecessary, depending instead on the hardware hierarchy.

These ordering rules are straightforward when there is a single producer and a single consumer, both operating on a single bus. The producer and consumer each operate according to the ordering rules and transactions are processed faithfully. Where problems arise is when an additional producer or an additional consumer, operating on a different bus, is also performing transactions within the system.

The ordering rules may also be beneficial in a multi-producer storage or hardware acceleration system. As with the example, above, the presence of multiple producers makes storage or any hardware acceleration more challenging than where there is a single producer and a single consumer.

Thus, there is a continuing need for a method to order operations in a multi-producer system, whether the ordering operations involve networking, storage, or any hardware acceleration.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIGS. 3A and 3B are simplified illustrations of the system of FIG. 2 processing posted and non-posted transactions, respectively, according to some embodiments;

FIGS. 4A-4F and 5A-5F are simplified illustrations of the system of FIG. 2 employing the transaction ordering method of FIG. 1, according to some embodiments;

DETAILED DESCRIPTION

In accordance with the embodiments described herein, a transaction processing method is disclosed to solve the issue of multiple producers (software and hardware) and a single or multiple consumers operating in a peer or hierarchical system. The transaction processing method is a deterministic method operable in a system having any number of producers or consumers. The producers and consumers may be any combination of hardware and software and may be part of peer or hierarchical systems.

The transaction processing method may be expanded to include communications, not merely in the consumer-to-producer direction, but may include communications from different producers to the same consumer. In some embodiments, the transaction processing method is employed in multiple instances within the same implementation, such as where there are a multicast group of multiple producers and a single or multiple consumers. In the multicast context as well as other multiple-producer contexts, the transaction processing method ensures that the PCIe ordering rules or any other producer/consumer guaranteeing specification and/or implementation are maintained.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
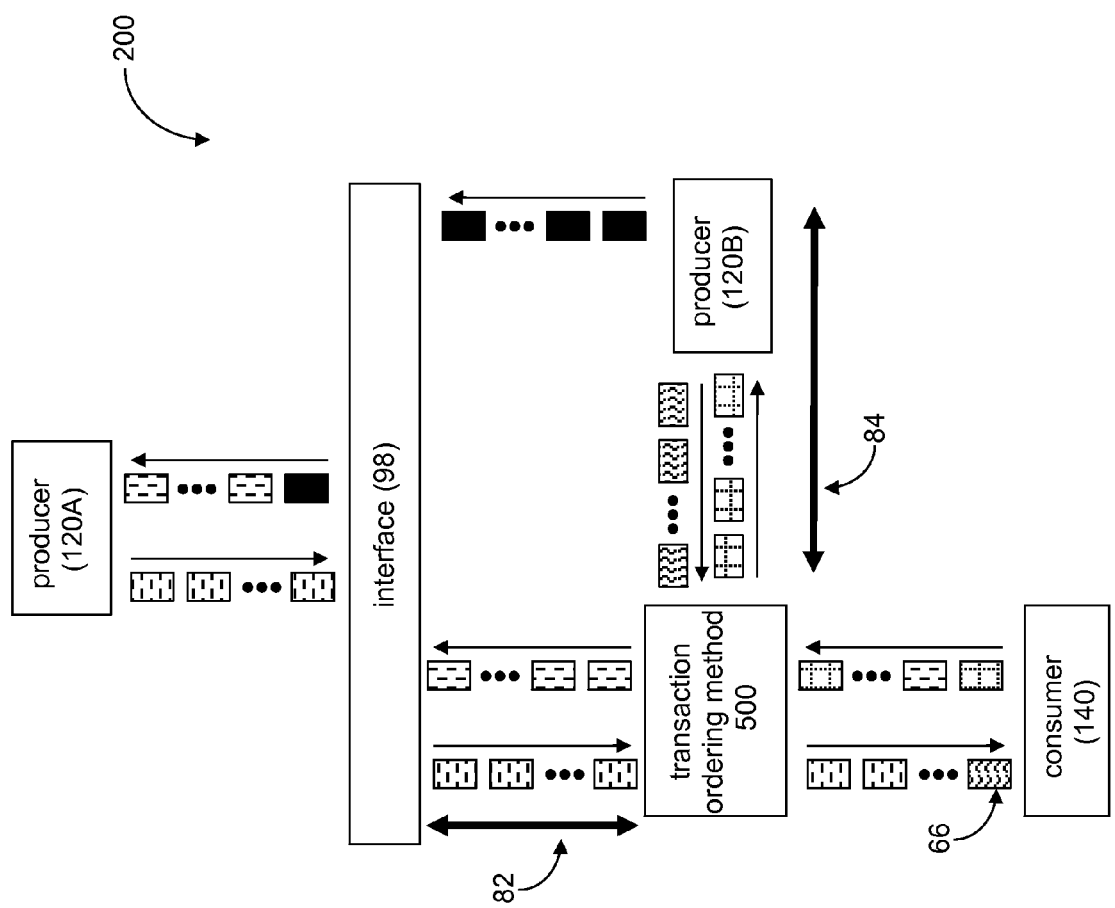
FIG. 1 is a simplified block diagram of a transaction ordering method operating in a multi-producer system, according to some embodiments.

FIG. 1 is a simplified block diagram of a transaction ordering method 500, useful in a multiple-producer system 200, according to some embodiments. The system 200 consists of producers 120A and 120B (collectively, producers 120), and one consumer 140. The producers 120 are each designed to communicate with the consumer 140 in accordance with PCIe ordering rules. Transaction layer packets (TLPs) 66 are shown with directional arrows, to denote the upstream and downstream transmission of the packets through the system 200. The movement of the TLPs through the system 200 are described in more detail, below. From the consumer 140 to the producer 120A, the TLPs 66 may travel along a first bus (82) or a second bus (84). In either case, the transaction ordering method 500 is involved.

Each producer 120 is presumed to be unaware of the presence of other producers in the system 200. Transactions between the producer 120A and the consumer 140 are independent and separate from transactions between the producer 120B and the consumer, for example. As is described in the following paragraphs, the transaction ordering method 500 is designed to ensure that transactions take place according to some predefined producer/consumer ordering rules, whether under PCIe or some other specification.

The multiple-producer system 200 may be any of a variety of computing systems. A system connected to a network is one example. Storage, database retrieval, and hardware acceleration are other real-world examples of systems in which the transaction ordering method 500 may be used to ensure certainty in processing transaction layer packets over multiple buses. The following example is a system connected to a network, although these other types of systems may similarly employ the transaction ordering method 500.

To support a variety of systems, a device manufacturer may include an on-chip system fabric (OSC) building block. The OSC building block is a standard interconnect used to connect two circuits or chips. In addition to providing the interconnect functionality, the OSC building block may include additional features or capabilities.

Figure 2:
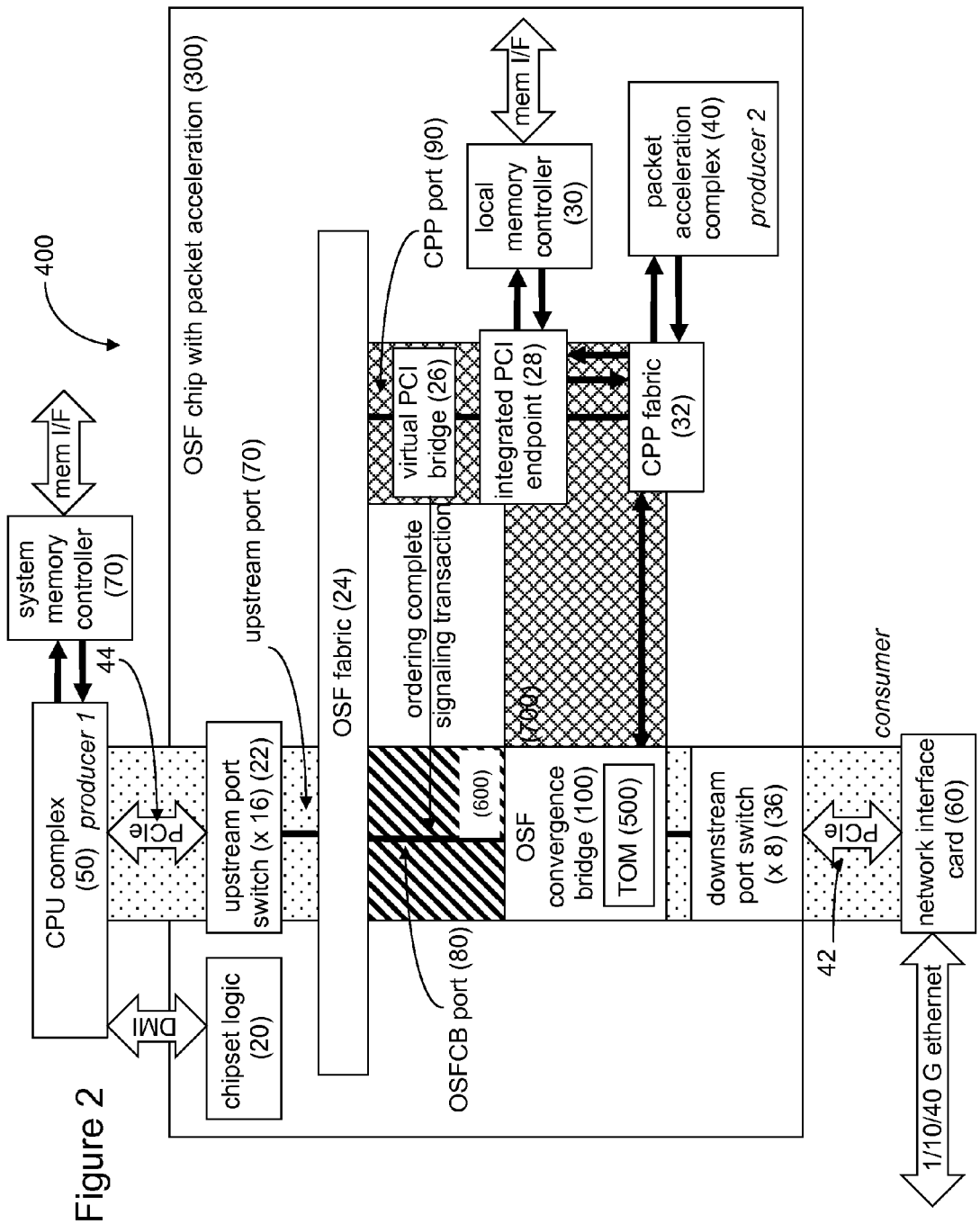
FIG. 2 is a block diagram of a system employing the transaction ordering method of FIG. 1, according to some embodiments.

One such OSC building block is depicted in a system 400 in FIG. 2, according to some embodiments. The system 400 consists of an OSC chip with packet acceleration 300, or OSC 300, coupled between a CPU complex 50 and a NIC 60. In addition to being connected to a memory controller 70, the CPU complex 50 may include a memory, a graphics controller, and so on (not shown). The NIC 60 couples the OSC 300 to the outside world, such as the Internet, through a 1/10/40 Gb/s Ethernet network. The CPU complex 50 may consist of a single or multiple processors.

The terms CPU, CPU complex, and software are used interchangeably herein. The software running on the CPU may consist of TCP/IP drivers, an operating system, a kernel, or a virtual machine. The CPU 50 is the producer of work in that the CPU schedules work and passes the description of the work to the NIC through descriptors. For example, the CPU 50 may schedule when a packet has to be transmitted out of the system, through the Ethernet. In that case, the CPU 50 creates descriptors, which the NIC 60 will fetch and execute. Once the CPU 50 hands off the descriptor to the NIC 60, then, by definition, the CPU produces the work (producer) and the NIC consumes the descriptor (consumer of the work description). The transaction ordering method 500 is designed to manage this particular example of the producer consumer model.

There may be other cases in which the NIC 60 is a producer, such as during the data phase of the moving the TLP to and from the NIC, in which the NIC performs a direct memory access (DMA) and acts as a master. The transaction ordering method 500 described herein does not pertain to that case.

The OSF chip 300 also provides packet acceleration functionality. A packet acceleration complex (PAC) 40 in the OSF 300 interacts with the networking stack (via the CPU complex 50) and the NIC 60. Like the CPU complex 50, the PAC 40 has its own memory controller 30, giving access to a system memory (not shown). In some embodiments, the PAC 40 of the OSF chip 300 is implemented in hardware, to offload several networking tasks that are traditionally managed by the CPU complex 50.

Because the packet acceleration complex 40 and the CPU complex 50 both operate with the NIC 60, the system 400 has the potential to have two producers (CPU and PAC) simultaneously giving orders to the NIC as consumer. Put another way, when the OSF chip 300 is disposed between the NIC 60 and the CPU complex 50, a system having only one producer at a time becomes a system with potentially multiple producers operating simultaneously.

As in FIG. 1, the system 400 has not simply two producers, the CPU 50 and the PAC 40, but two buses through which the TLPs may travel. The system 400 includes an OSF bus 600 (right diagonal striped) and a CPP bus 700 (cross-hatched). TLPs 66 traveling from the NIC 60 upstream will reach an OSF convergence bridge 100, disposed between the two buses. The OSF convergence bridge 100 is able to discern which bus the TLPs 66 will traverse to get to the CPU complex 50, based on descriptors within the TLP.

As part of the system 400, the OSF 300 also features upstream and downstream switch ports 22, 36, respectively, OSF fabric 24, a virtual PCI bridge 26, an integrated PCI endpoint 28, a local memory controller 30 to interface to local memory (not shown), chassis push-pull (CPP) fabric 32, and the packet acceleration complex 40.

The OSF 300 includes two different hardware paths between the CPU complex 50 and the NIC 60, through which TLPs 66 are processed. In FIG. 2, these paths are uniquely coded for ease of understanding. Beginning at the NIC 60, a single north-going path (polka-dotted) begins with the PCIe connector 42, the 8-bit downstream port switch 36, up to the OSF convergence bridge 100. From here, the path splits into two paths, known herein as the OSF bus 600 (right diagonal striped) and the CPP bus 700 (cross-hatched). The OSF bus 600 (right diagonal striped) starts at the OSF convergence bridge 100 and ends at the OSF fabric 24. The CPP bus 700 (cross-hatched) also starts at the OSF convergence bridge 100 and ends also at the OSF fabric 24, passing through the CPP fabric 32, the integrated PCI endpoint 28, and the virtual PCI bridge 26. From the OSF fabric 24, the TLPs 66, coming from either bus 600 or 700, again pass through a single north-side path (polka-dotted), through the upstream port switch 22 and the PCIe connector 44 to the CPU complex 50.

For at least some of the transactions, both the CPU complex 50 and the PAC 40 operate as producers, shown in FIG. 2 as producer 1 and producer 2, respectively, while the NIC 60 operates as a consumer. It is for these types of transactions, in which there are two entities simultaneously operating as producers, and two paths or buses through which TLPs 66 may be transmitted, that the transaction ordering method 500 is designed, in some embodiments.

The NIC 60 may interact with the CPU complex 50 through the OSF fabric 24. Examples of such interaction include a read completion to a memory-mapped I/O and interrupts, as well as any packets that are not processed by the packet acceleration complex 40 because the complex is not ready. In some embodiments, the NIC 60 does not understand that there are two different masters in the system 400. Nor does the NIC 60 understand that packets may traverse one of two different buses 600, 700.

So, when a received packet is to be pushed into the system memory (stored), or an interrupt has to be sent to the CPU complex 50, or a read completion to the memory mapped I/O read has to be returned from the NIC 60, the fact that two different data paths (buses) exist causes issues. It is difficult to maintain the ordering between packets traversing two different data paths without significant performance issues, particularly when neither the NIC 60, the CPU complex 50, nor the packet acceleration complex 40 are aware that two data paths exist. Further, this arrangement may violate the PCIe ordering rules, which may break the producer-consumer model. Violating the producer-consumer model may make it hard for software to use the NIC 60.

In some embodiments, the transaction ordering method (TOM) 500 solves the issues described above. FIGS. 3A-3B, and 4A-4F are simplified block diagrams depicting how the transaction ordering method 500, as part of the OSF convergence bridge 100, maintains PCIe ordering rules with incoming packets. Along with the convergence bridge 100, the CPU complex 50, the NIC 60, the PAC 40, and the OSF fabric 24 from the system 400 of FIG. 2 are shown. Also indicated are the OSF bus 600 (left side) and the CPP bus 700 (right side).

FIGS. 3A and 3B illustrate how posted and non-posted transactions, respectively, are processed on the system 400 of FIG. 2, according to some embodiments. Several TLPs 66 are shown streaming into the convergence bridge 100 from the NIC 60 (upstream). In this scenario, the NIC 60 is initiating the transaction request (thus, the NIC is known as a requester). The convergence bridge 100 decides, based on its descriptor, whether the TLPs 66 will traverse the OSF bus 600 or the CPP bus 700. The upstream TLPs are shown in dotted checkerboard and vertical dashed. TLPs 66 traversing the CPP bus 700 (dotted checkerboard) may be optimized by the PAC 40 (solid black) before being received by the CPU complex 50. The TLPs 66 traversing the OSF bus (vertical dashed) go directly to the CPU complex 50.

Where the TLPs 66 are posted transactions, such as memory writes, there would be no completion TLPs. This scenario is depicted in FIG. 3A, which shows no downstream transmissions of TLPs. The TLPs (dotted checkerboard) transmitted by the NIC 60 are received by the convergence bridge 100, then sent on the CPP bus 700 to the PAC 40, where they are optimized (solid black) before being transmitted to the OSF fabric 24, then to the CPU complex 50. The TLPs (vertical dashed) are received by the convergence bridge 100, then sent on the OSF bus 600 to OSF fabric 24, then to the CPU complex 50.

Where, however, the TLPs 66 are non-posted transactions, such as memory reads, there are completion TLPs that travel downstream following the non-posted TLP. The completion TLPs are shown in FIG. 3B as waves and horizontal dashed. Where the non-posted TLP 66 traverses the CPP bus 700 (dotted checkerboard), the completion TLP also traverses the CPP bus (waves). Where the non-posted TLP 66 traverses the OSF bus 600 (vertical dashed), the completion TLP also traverses the OSF bus (horizontal dashed). Thus, the completion TLPs 66 follow the same path traversed by the initiating (requester) TLPs, but travel in the opposite direction.

In FIG. 3B, the TLPs 66 streaming in from the NIC 60 are simultaneously traversing two different paths, the OSF bus 600 and the CPP bus 700. FIGS. 4A-4F show how the transaction ordering method 500 ensures that the incoming stream of TLPs is received by the CPU complex 50 in the appropriate order. Starting with FIG. 4A, a TLP 66 that needs to be ordered with respect to one or more previous transactions, known herein as an order-dependent transaction 68 (diamond) is shown reaching the OSF convergence bridge 100. Based on the headers in the TLP 68, the convergence bridge 100 knows that the TLP is intended for the OSF bus (see TLP 88).

Recall that the order-dependent transaction is one that cannot be processed until previously submitted transactions are processed. If the order-dependent transaction is processed "out of order", then the results obtained will be uncertain. Examples of order-dependent transactions include memory read transactions (or, more precisely, the completion of the read request) and interrupts. Thus, the TLP 68 may be a memory read request from the NIC 60 to the system memory (not shown), which is serviced by CPU complex 50.

As illustrated in FIG. 4B, upon receiving the order-dependent transaction 68 (diamond), the convergence bridge 100 first determines which bus the TLP 68 is intended for, the OSF bus 600 or the CPP bus 700. The convergence bridge 100 next sends a dummy transaction, shown as TLP 72 (black with polka dots) to the bus that the TLP is not intended for, in this case, the CPP bus 700. The succeeding figures show what happens next. In FIG. 4C, as the dummy transaction 72 flows through the CPP bus 700, the pending TLPs are processed up through the CPP fabric. Thus, all TLPs 66 being received into the PAC 40 are processed, and are thereafter sent up the CPP bus 700 to the CPU complex 50.

Meanwhile, on the OSF bus 600, transactions are also being processed. TLPs 66 that were sent from the convergence bridge 100 through the OSF bus 600 (vertical dashed) are sent to the CPU complex 50. Completion packets from the CPU complex 50 travel downstream through their respective buses back to the NIC 60, with the horizontal dashed TLPs traversing the OSF bus 600 and the waves TLPs traversing the CPP bus 700.

The convergence bridge 100 is not concerned with the downstream TLPs, however. Instead, once the dummy TLP 72 is sent to the CPP bus 700, the convergence bridge 100 is concerned only that all upstream TLPs that are sitting on the CPP bus are processed through the fabric to the CPU complex 50. In FIG. 4D, the dummy TLP 72 is shown at the top of the CPP bus 700, indicating that it has pushed through all prior transactions. At this time, no transactions follow the dummy TLP 72, and at least the upstream portion of the CPP bus 700 is empty.

Next, as illustrated in FIG. 4E, an "ordering complete signaling transaction" (OCST) indicator is issued to the convergence bridge 100. The OCST indicator may be an out-of-band signal issued to the convergence bridge 100 or it may be an in-band transmission of the dummy TLP 72 through the OSF fabric 24. The OCST indicates that the dummy TLP 72 pushed through all pending upstream transactions through the CPP bus 700. This clears the path for the order-dependent transaction 68 (diamond) to be processed by the convergence bridge 100. In FIG. 4F, the order-dependent transaction 68 is shown traversing the OSF bus 600.

Similarly, the order-dependent transaction 68 could also traverse the CPP bus 700. FIGS. 5A-5F show the operations employed by the transaction ordering method 500 when the order-dependent TLP (diamond) is intended for the CPP bus 700 rather than the OSF bus 600, according to some embodiments.

Figure 6:
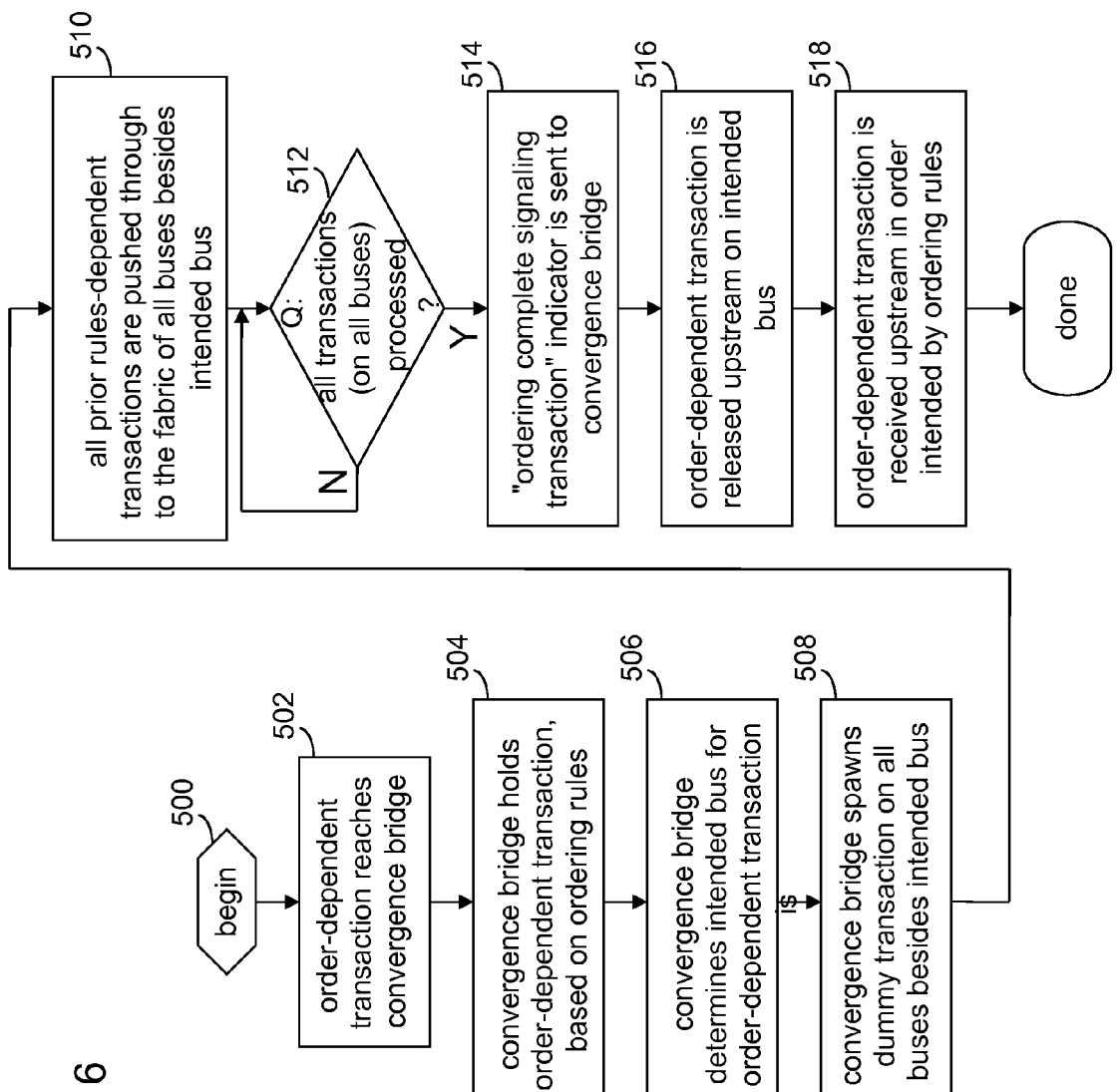
FIG. 6 is a flow diagram employed by the transaction ordering method of FIG. 1, according to some embodiments.

The transaction ordering method 500 is described in the flow diagram of FIG. 6, according to some embodiments. When an order-dependent transaction reaches the OSF convergence bridge 100 (block 502), the OSF convergence bridge 100, using the transaction ordering method 500, detects that transaction based on the PCIe ordering rules (block 502 and FIG. 4A). The OSF convergence bridge 100 holds the ordering-dependent transaction (block 504). In some embodiments, the OSF convergence bridge 100 holds the ordering-dependent transaction in an upstream transaction queue (not shown). The convergence bridge 100 determines the intended bus for the order-dependent transaction, by looking at the header in the TLP (block 506), and then spawns a transaction on the one or more remaining buses, in this case, the CPP bus 32 (block 508 and FIG. 4B). This spawned transaction 72 is actually a dummy transaction, treated by the chip 300 as a posted write operation on the CPP bus 32 in terms of satisfying transaction ordering on the CPP bus upstream to the OSF fabric 24. Standard PCIe ordering rules apply on the CPP bus 32 as the dummy transaction heads upstream toward the OSF fabric 24, which, in effect, pushes all posted transactions out ahead of the spawned transaction (FIGS. 4C and 4D).

In some embodiments, the spawned transaction on the CPP bus is a simple ordering transaction. The ordering transaction forces all the previous PCIe ordering rules-dependent transactions that are sitting on either the CPP bus 32, the integrated PCIe endpoint 28, or the virtual PCI bridge 26 to be pushed through to the OSF fabric 24 (block 510). This continues until all sitting transactions on the CPP bus are processed (block 512). An "ordering complete signaling transaction" indicator then flows through the OSF fabric 24 after the previous transactions from the CPP port 90 of the OSF fabric 24 back to the OSFCB port 80 (FIG. 2) (block 514 and FIG. 4E).

The order-dependent transaction may, for example, be a read completion (where a read request is made, a read completion always follows) or an interrupt. What is meant by "push[ing] through the OSF fabric 24" is that any operations pending on the CPP side prior to the insertion of the dummy transaction are completed prior to the processing of the dummy transaction on the CPP side. Following this pushing operation, the order-dependent transaction that was held on the OSF side (block 504) may be processed (block 514 and FIG. 4F), with the PCIe ordering rules being maintained.

When the OSF convergence bridge 100 receives the "ordering complete signaling transaction", the order-dependent transaction is released upstream (block 514), to be received by the CPU complex 50 (block 516). In some embodiments, the spawned (dummy) transaction gets routed, peer-to-peer, across the OSF fabric 24 and back downstream to the OSF convergence bridge 100. When it receives the dummy transaction, the OSF convergence bridge 100 releases the pending transaction(s). Because the order-dependent transaction reaches the producer (in this case, the CPU complex 50), after all the previous transactions have reached it, the CPU complex 50 does not have to deal with multiple-producer-single-consumer issues. The transaction ordering method 500 of the OSF convergence bridge 100 also essentially hides the fact that there are multiple paths (OSF and CPP) to the same producer (CPU complex 50) and the same consumer (NIC card 60), and ensures that the transactions look as if they traversed a single path.

In some embodiments, the transaction ordering method 500 is implemented in software, hardware, or a combination of software and hardware, on a processor-based system. The OSF convergence bridge 100 knows when it has an ordering-dependent transaction. In some embodiments, the rules employed by the OSF convergence bridge 100 are predetermined. For example, the OSF convergence bridge 100 queues any non-posted transactions or a message-signaled-interrupt (MSI). Once either of those transaction types is queued, the OSF convergence bridge 100 pends the transaction in question, spawns the dummy transaction up the CPP path. Only after receiving back the dummy transaction on its upstream interface does the OSF convergence bridge 100 release the originally queued transaction.

Figure 7A:
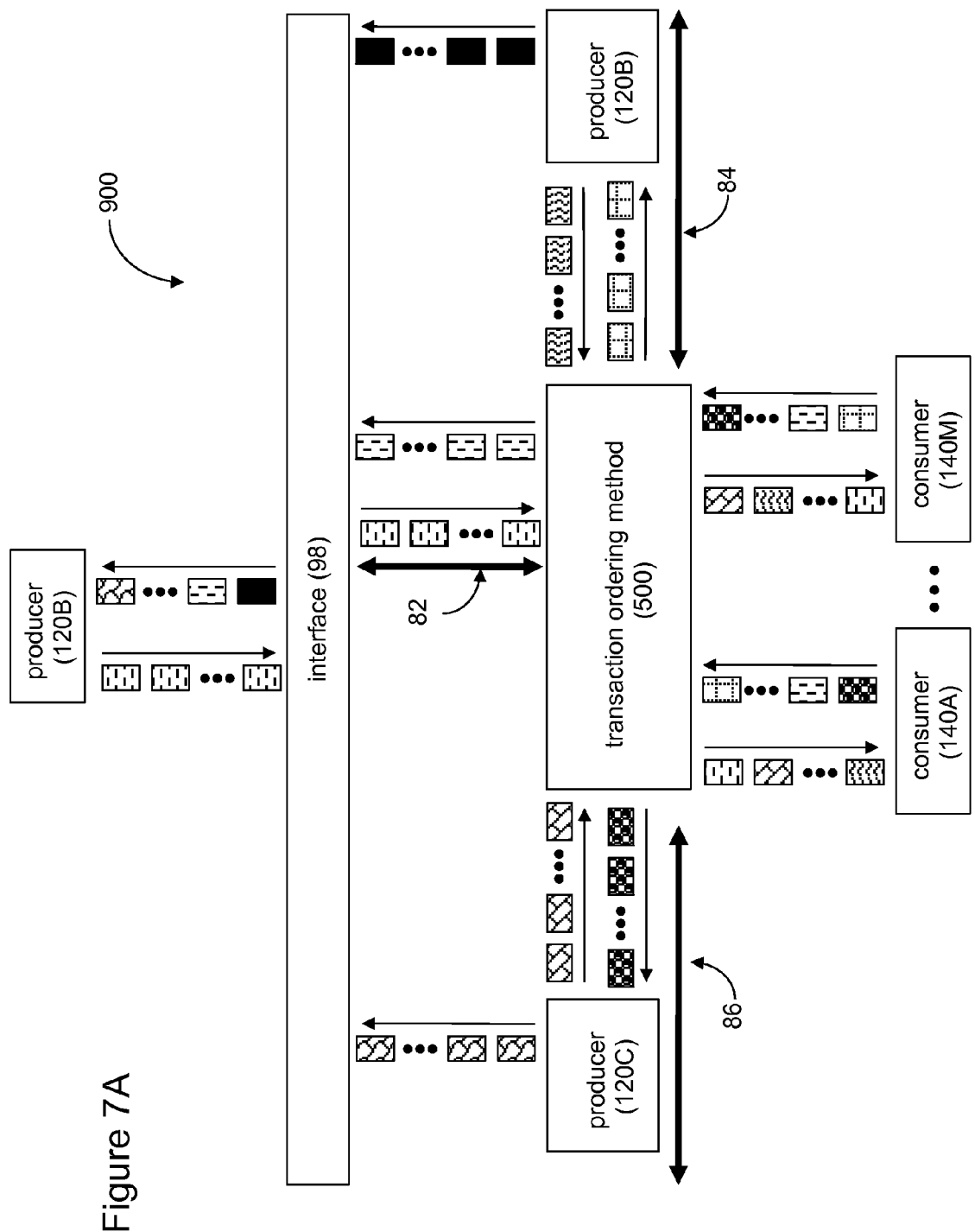
FIGS. 7A and 7B are simplified block diagrams of the transaction ordering method of FIG. 1 with an additional producer and bus as well as additional consumers, according to some embodiments.
Figure 7B:
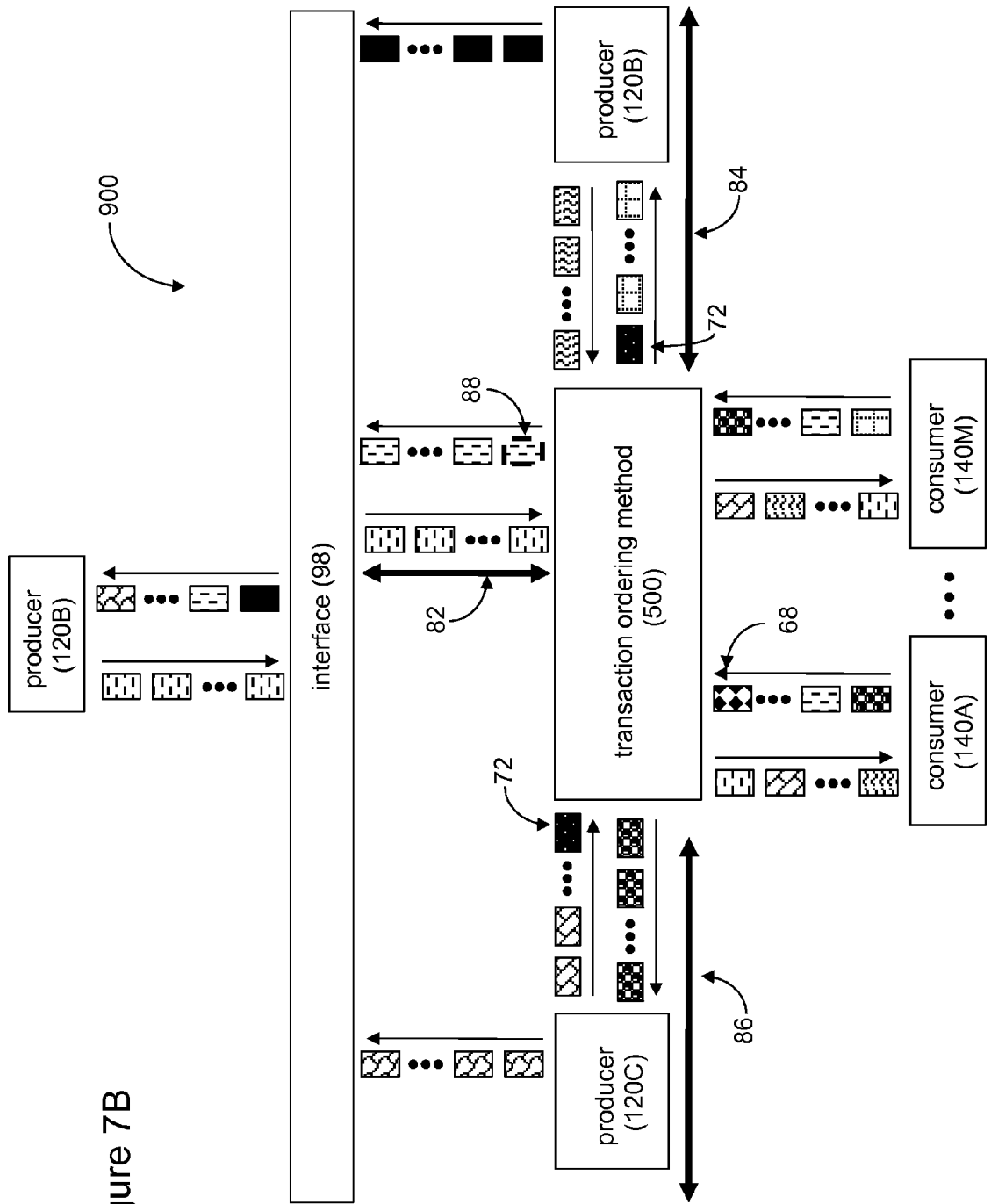

FIGS. 7A and 7B are simplified block diagrams of a system 900 employing the transaction ordering method of FIG. 1, with an additional producer and bus as well as additional consumers, according to some embodiments. The system 900 features M consumers 140A, . . . 140M, for integer M. In addition to the two producers 120A and 120B, a third producer 120C is disposed between the transaction ordering method 500 and the producer 120A. Instead of having two paths (buses) 82, 84, a third bus 86 adds additional complexity.

Because it is disposed at the dividing point of multiple paths upstream, the transaction ordering method 500 is able to block order-dependent TLPs from being processed before prior transactions are done being processed. As illustrated in FIG. 7B, the transaction ordering method 500 receives the order-dependent transaction 68 from any of the consumers 140A, . . . 140M, determines which bus the order-dependent TLP is intended for (see thick dashed TLP 88 along path 82), and sends a dummy transaction 72 (black with polka dots) to the two buses not intended to receive the TLP 68. This causes all pending TLPs on the two buses to be pushed upward through their respective bus fabrics. Once all pending TLPs have been processed, the TLP 68 is released up through its intended bus.

The above principles may be extended to any number of buses, with the transaction ordering method 500 sending flushing transactions (black with polka dots) to all the buses not in the path of the order-dependent TLP, causing the transactions to be processed, before allowing the order-dependent TLP to be processed.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A transaction ordering method for use in a system having one or more consumers, a first producer, and a second producer, the method comprising:

receiving, by an agent, an order-dependent transaction from the consumer, the agent being between a first bus and a second bus, the order-dependent transaction being intended for the first producer, wherein the first producer is on the first bus and a second producer is on the second bus;

sending, by the agent, a dummy transaction to the second producer on the second bus, the second bus comprising one or more pending transactions, wherein the dummy transaction causes the one or more pending transactions on the second bus to be flushed;

flushing on the second bus, the one or more pending transactions;

receiving, by the agent, an indication that the one or more pending transactions are completed; and releasing, by the agent, the order-dependent transaction to the first producer on the first bus.

2. The transaction ordering method of claim 1, further comprising:

holding, by the agent, the order-dependent transaction in an upstream transaction queue.

3. The transaction ordering method of claim 2, receiving, by the agent, the order-dependent transaction from a consumer further comprising:

receiving, by a transaction ordering unit, the order-dependent transaction from a consumer;

wherein the transaction ordering unit is disposed between the consumer and the two buses.

4. The transaction ordering method of claim 3, sending, by the agent, the dummy transaction to the second producer on the second bus further comprising:

sending, by the transaction ordering unit, the dummy transaction to the second bus to flush out the previous transactions.

5. The transaction ordering method of claim 1, receiving, by the agent, the order-dependent transaction further comprising:

receiving, by the agent, an interrupt.

6. The transaction ordering method of claim 1, receiving, by the agent, the order-dependent transaction further comprising:

receiving, by the agent, a request to read from a memory.

7. The transaction ordering method of claim 1, receiving, by the agent, the order-dependent transaction further comprising:

receiving, by the agent, a request to read from a memory-mapped I/O.

8. The transaction ordering method of claim 1, receiving, by the agent, an indication that the one or more pending transactions are completed further comprising:

receiving, by the agent, an "ordering complete" signal from the second bus.

9. The transaction ordering method of claim 8, further comprising:

receiving the "ordering complete" signal from the second bus to the first bus, as routed, peer-to-peer, through a fabric of the bus, to the ordering agent sitting between the two buses.

10. The transaction ordering method of claim 8, further comprising:

receiving, by the agent, an "ordering complete" transaction downstream on the first bus.

11. The transaction ordering method of claim 8, further comprising:

releasing, by the agent, the order-dependent transaction.

12. The transaction ordering method of claim 1, receiving, by the agent, an indication that the one or more pending transactions are completed further comprising:

receiving, by the agent, the dummy transaction.

13. A system, comprising:

a first producer on a first bus, the first producer to process packets received from a consumer, wherein the consumer is coupled to a convergence bridge;

a second producer on a second bus, the second bus being connected to the first bus through the convergence bridge; and the convergence bridge coupled between the first bus and the second bus, the convergence bridge to:

receive an order-dependent transaction from the consumer, wherein the order-dependent transaction is to be transmitted to the first producer on the first bus;

send a dummy transaction to the second producer on the second bus, wherein the second bus has one or more pending transactions;

receive an indication that the dummy transaction has flushed the one or more pending transactions from the second bus; and send the order-dependent transaction to the first producer on the first bus.

14. The system of claim 13, wherein the indication is a signal from the second bus.

15. The system of claim 13, wherein the indication is a transaction through the first bus.

16. The system of claim 13, wherein the convergence bridge further:

holds the order-dependent transaction in a temporary storage location.

17. The system of claim 13, wherein the order-dependent transaction is processed according to PCIe transaction ordering rules.

18. The system of claim 13, wherein the ordering-dependent transaction comprises an interrupt.

19. The system of claim 13, wherein the ordering-dependent transaction comprises a request to read from a memory.

20. The system of claim 13, wherein the ordering-dependent transaction comprises a request to read from a memory-mapped I/O.

21. The system of claim 13, further comprising:

a third producer on a third bus, the third bus being connected to the first bus, wherein the convergence bridge sends a second dummy transaction to the third producer on the third bus, the third bus having one or more pending transactions;

wherein the order-dependent transaction is received by the first producer after the one or more pending transactions on the second and third buses have been flushed.

22. A transaction ordering method for use in a system having one or more consumers and at least two producers, the method comprising:

receiving, by an agent on a first bus, an order-dependent transaction from a consumer of the one or more consumers, wherein the order-dependent transaction is intended for a first producer of the at least two producers;

sending, by the agent, a dummy transaction to a second bus, a second producer of the at least two producers being connected to the second bus, the second bus comprising one or more pending transactions, wherein the agent knows that the order-dependent transaction is intended for the first producer and wherein the dummy transaction causes the one more pending transaction on the second bus to be flushed;

receiving, by the agent, an indication from the second bus that the one or more pending transactions are completed; and releasing, by the agent, the order-dependent transaction.

23. The transaction ordering method of claim 22, further comprising:

sending, by the agent, the order-dependent transaction to the first producer;

wherein the order-dependent transaction is processed according to a specification of producer/consumer ordering rules.

24. The transaction ordering method of claim 22, receiving, by the agent on the first bus, an order-dependent transaction from the consumer further comprising:
   receiving, by the agent, the order-dependent transaction from an input/output device;
wherein the input/output device is coupled between the agent and the two buses.

25. The transaction ordering method of claim 24, sending, by the agent, the dummy transaction to the second bus further comprising:
   sending, by the agent, the dummy transaction to a input/output acceleration circuit on the second bus to flush out the previous transactions;
wherein the input/output acceleration circuit is the second producer of the at least two producers.

26. The transaction ordering method of claim 22, receiving, by the agent, an ordering-dependent transaction from the consumer further comprising:
   receiving, by the agent, an interrupt.

27. The transaction ordering method of claim 22, receiving, by the agent, an ordering-dependent transaction from the consumer further comprising:
   receiving, by the agent, a request to read from a memory.

28. The transaction ordering method of claim 22, receiving, by the agent, an ordering-dependent transaction from the consumer further comprising:
   receiving, by the agent, a request to read from a memory-mapped I/O.

* * * * *